2,729,948

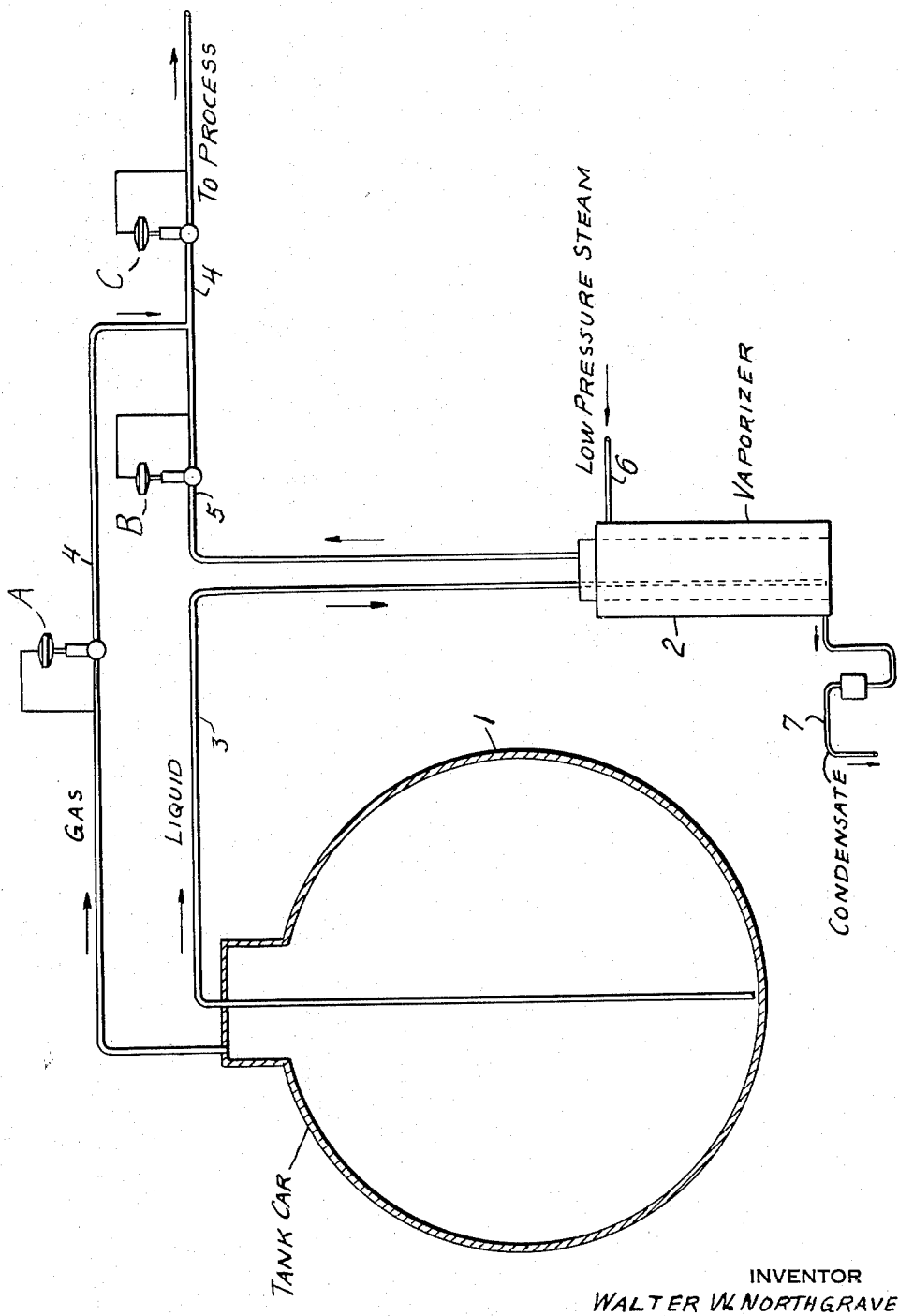

PROCESS OF TRANSFER OF LIQUEFIED GAS

Walter W. Northgraves, Kenmore, N. Y., assignor to Olin Mathieson Chemical Corporation, a corporation of Virginia Application February 18, 1953, Serial No. 337,469

2 Claims. (Cl. 62—1)

My invention relates to means for withdrawing a liquefiable gas at a desired process pressure in gaseous state from a pressure vessel containing the gas in liquid state.

In a system for removing a liquefiable gas such as, for example, carbon dioxide, ammonia, chlorine, and methane from, for example, a railway tank car containing the gas in liquid state, there are two primary considerations. The first is that the pressure in the car cannot be allowed to rise too high, for example, through absorption of heat from the atmosphere and vaporization of the liquefied gas in the tank car, lest the valves start popping. The second is that the pressure in the car cannot be allowed to fall too low by continuously withdrawing the gas in gaseous state lest the temperature fall below the minimum allowed by I. C. C. regulation. My invention guards against both of these situations by means of an interconnected group of pressure regulating devices which in cooperation with a vaporizer control the amounts of gas in gaseous and liquid state withdrawn from the tank car and supply the gas in gaseous state at a desired pressure to a process.

According to my invention a liquefiable gas in gaseous state is discharged from a pressure vessel such as a tank car containing the gas in liquid state at a desired process pressure by withdrawing gas from the upper portion of the pressure vessel through a line leading to a process requiring the liquefiable gas in gaseous state at the desired pressure. The gas is passed through a first pressure regulating device adjusted to close at a pressure in the pressure vessel corresponding to a permissible temperature for the liquefied gas in the pressure vessel. The gas passing through the first pressure regulating device then is passed through a second pressure regulating device adjusted to open when the process pulls the line pressure below the desired pressure. Liquefied gas is withdrawn from the lower portion of the pressure vessel through a second line and is passed to a vaporizing unit to which heat is continuously supplied. Gas is withdrawn from the vaporizing unit through a third line communicating with the line leading to the process at a point between the two pressure regulating devices. A third pressure regulating device contained in the third line is adjusted to open at a pressure in the line leading to the process between the pressure at which the first pressure regulating device is adjusted to close and the pressure at which the second pressure regulating device is adjusted to open, thus maintaining a pressure above the process pressure at the inlet of the second pressure regulating device.

My invention thus provides a method for conveniently and safely discharging a liquefiable gas from a pressure vessel containing the gas in liquid state at various process pressures. The resulting flexibility of operation and the safety features embodied in the invention permit direct withdrawal from a railway tank car of a liquefiable gas in gaseous state and eliminate the requirement for an intermediate pressure vessel where the consumer's demand is sufficient to empty the tank car in a reasonable amount of time.

A typical system for withdrawing a liquefiable gas in gaseous state at a desired process pressure from a tank car containing the gas in liquid state is illustrated in the accompanying schematic drawing. The operation of the system will be described with reference to carbon dioxide as the liquefiable gas.

In the drawing numeral 1 represents a tank car, numeral 2 indicates a liquid carbon dioxide vaporizer heated by low pressure steam entering at line 6 and leaving at line 7, line 3 leads from the tank car to the vaporizer, line 4 leads from the tank car to the process and line 5 connects the vaporizer and line 4.

In operation, liquid carbon dioxide in tank car 1 evaporates with absorption of heat through the tank car walls from the atmosphere to provide gaseous carbon dioxide in the upper portion of the tank car and in line 4 up to the inlet of valve C, valve A being open. Valve A is adjusted to close at a pressure in the tank car corresponding to a permissible temperature for the liquid carbon dioxide in the tank car. The minimum temperature in a liquid carbon dioxide containing tank car allowed by I. C. C. regulation is $-20°$ F., and the pressure corresponding to this temperature is 214.8 p. s. i. g. Thus valve A must be adjusted to close at a pressure safely above 214.8 p. s. i. g. but low enough to discharge as much carbon dioxide as possible in gaseous form from the tank car, i. e. at a pressure between about 220 p. s. i. g. and 230 p. s. i. g. If, for example, gaseous carbon dioxide at a relatively low process pressure of the order of, for example, 50 p s. i. g. is desired, valve C in gas distribution line 4 to process opens when the process pulls the line pressure on the process side of valve C below 50 p. s. i. g. When the process pulls the line pressure in line 4 and the upper portion of the tank car to, for example, 225 p. s. i. g. valve A closes and the pressure in line 4 following the valve rapidly drops. Valve B then opens and liquid carbon dioxide passes through line 3 to vaporizer 2 and is evaporated with the absorption of heat from low pressure steam, introduced to the vaporizer through line 6 and withdrawn through line 7, providing gaseous carbon dioxide in line 5 up to the inlet of valve B at a pressure approximating the pressure of the liquid carbon dioxide in the tank car. Line 5 containing valve B connects with line 4 at a point between valves A and C. Valve B may be adjusted to open when the pressure in line 4 between valves A and C drops to a pressure between that at which valve A is adjusted to close and that at which valve C is adjusted to open, but ordinarily valve B is adjusted to open at a pressure in line 4 between about 75 p. s. i. g. and 150 p. s. i. g. Thus with valve C open and valve A closed, gaseous carbon dioxide at above process pressure is supplied to the inlet of valve C through line 5 and valve B. Valve B, by controlling the amount of gas removed from vaporizer 2, also controls the rate at which the liquid carbon dioxide flows into the vaporizer. Vaporizer 2 should be designed for a capacity safely above the largest momentary rate of gaseous carbon dioxide flow the process might demand.

Valve A would of course be adjusted to close at a different pressure corresponding to a permissible temperature for another liquefied gas in the tank car. With gases boiling higher than carbon dioxide such as for example, ammonia or chlorine, the pressure at which valve A is adjusted to close will be lower than that for carbon dioxide. With very low boiling gases such, for example, as methane, the pressure at which valve A is adjusted to close will be very much higher in order to avoid reduction of the temperature of the liquid in the tank car below I. C. C. limit. If however, the liquefiable gas is contained in a pressure storage vessel which is stationary or is constructed from a special steel, and thus may be safely subjected to temperatures below those specified by I. C. C. regulations, correspondingly lower pressures at which valve A may be adjusted to close are possible.

I claim:

1. A method for discharging a liquefiable gas in gaseous state at a desired process pressure from a pressure vessel containing the gas in liquid state which comprises withdrawing gas from the upper portion of the pressure vessel through a line leading to a process requiring the liquefiable gas at the desired pressure, passing the gas through a first pressure regulating device adjusted to close at a pressure in the pressure vessel corresponding to a permissible temperature for the liquefied gas in the pressure vessel, passing the gas through a second pressure regulating device adjusted to open at a pressure less than the desired process pressure on the process side of the line, withdrawing gas in the liquid state from the lower portion of the pressure vessel through a second line, passing the liquefied gas to a vaporizing unit, continuously supplying heat to the vaporizing unit, withdrawing gas from the vaporizing unit through a third line communicating with the line leading to the process at a point between the two pressure regulating devices, said third line containing a third pressure regulating device adjusted to open at a pressure in the line leading to the process between the pressure at which the first pressure regulating device is adjusted to close and the pressure at which the second pressure regulating device is adjusted to open.

2. A system for discharging a liquefiable gas in gaseous state at a desired process pressure from a pressure vessel containing the gas in liquid state which comprises, in cooperation with a pressure vessel and a process requiring the liquefiable gas in gaseous state at a desired process pressure, a first line connecting the upper portion of the pressure vessel with the process, a pressure regulating device in the first line adjusted to close at a pressure in the pressure vessel corresponding to a permissible temperature for the liquefied gas in the pressure vessel, a second pressure regulating device in the first line adjusted to open at a pressure less than the desired process pressure, a vaporizing unit, means for supplying heat to the vaporizing unit, a second line connecting the lower portion of the pressure vessel with the lower portion of the vaporizing unit, a third line connecting the upper portion of the vaporizing unit with the first line at a point between the two pressure regulating devices, and a third pressure regulating device in the third line adjusted to open at a pressure in the first line between the pressure at which the first pressure regulating device is adjusted to close and the pressure at which the second pressure regulating device is adjusted to open.

References Cited in the file of this patent

UNITED STATES PATENTS

| | | |
|---|---|---|
| 1,853,983 | Leach | Apr. 12, 1932 |
| 2,456,890 | St. Clair | Dec. 21, 1948 |
| 2,576,985 | Wildhack | Dec. 4, 1951 |